(12) United States Patent
Bond et al.

(10) Patent No.: US 6,810,517 B2
(45) Date of Patent: **\*Oct. 26, 2004**

(54) PROGRAM-INTERFACE CONVERTER FOR MULTIPLE-PLATFORM COMPUTER SYSTEMS

(75) Inventors: Barry Bond, Renton, WA (US); Ori Gershony, Seattle, WA (US); David E. Hastings, Carnation, WA (US); Jonathan C. Lew, Redmond, WA (US); Alan M. Warwick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 704 days.

This patent is subject to a terminal disclaimer.

(21) Appl. No.: 09/791,006

(22) Filed: Feb. 22, 2001

(65) Prior Publication Data

US 2001/0008023 A1 Jul. 12, 2001

Related U.S. Application Data

(63) Continuation of application No. 09/461,860, filed on Dec. 15, 1999, now Pat. No. 6,233,731, which is a continuation of application No. 08/912,454, filed on Aug. 18, 1997, now Pat. No. 6,026,238.

(51) Int. Cl.[7] .............................. G06F 9/45; G06F 9/44
(52) U.S. Cl. ....................................... 717/138; 719/328
(58) Field of Search ................................ 717/138, 144, 717/147; 719/328

(56) References Cited

U.S. PATENT DOCUMENTS

| 5,390,314 A | 2/1995 | Swanson |
| 5,406,644 A | 4/1995 | MacGregor |
| 5,680,551 A | 10/1997 | Martino, II |
| 5,687,376 A | 11/1997 | Celi, Jr. et al. |
| 5,715,459 A | 2/1998 | Celi, Jr. et al. |
| 5,729,748 A | 3/1998 | Robbins et al. |
| 5,754,858 A | 5/1998 | Broman et al. |
| 5,764,974 A | 6/1998 | Murphy et al. |
| 5,910,180 A | 6/1999 | Flory et al. |
| 6,026,238 A | 2/2000 | Bond et al. |
| 6,052,527 A | 4/2000 | Delcourt et al. |
| 6,233,731 B1 * | 5/2001 | Bond et al. .................. 717/138 |

OTHER PUBLICATIONS

Tamasanis, D., "A Less Wobbly Wabi: Unix gets Windows–friendly: Wabi 2.0 is faster, runs more Windows applications and now supports OLE 2", BYTE [on line] Retrieved from the internet http://byte.com/art/9507/sec9/art9.htm (Jul. 1995).

Barbagallo, C., "SunSoft offers SoftWindows 2.0", *Business Wire*, San Francisco, CA (Feb. 1996).

Business Wire: "Sun OpenStep Solutions Answer Custermer Needs for Rapid Application Development; Ships Industry–Leading Object Technology in Solaris OpenStep and Workshop OpenStep Products", *Business Wire*, p08201096, Gale Group, (Aug. 1995).

(List continued on next page.)

*Primary Examiner*—Kakali Chaki
*Assistant Examiner*—Trent J Roche
(74) *Attorney, Agent, or Firm*—Leydig, Voit & Mayer, Ltd.

(57) ABSTRACT

A utility program develops and updates an API-translation layer of an emulator for running programs written for one platform on another platform. The utility builds a module for each API from a set of templates to execute the API's function on the other platform. Generalized function templates iterates through API functions. Exception templates can override the generalized templates in specific cases. Types templates convert individual arguments of the API. Code templates contain code for incorporation into a number of other templates.

8 Claims, 4 Drawing Sheets

OTHER PUBLICATIONS

Rothenberg, M., "XVT Smooths GUI Development Across Platforms", *MacWeek*, vol. 6, No. 25, pp. 10–11 (Jun. 1998).

Rosenblum, et al., "Using the SimOS Machine Simulator to Study Complex Systems", *ACM Transactions on Modeling Computer Simulation*, vol. 7, No. 1, pp. 78–103 (Jan. 1997).

Farnum, R,, "Applications Programming Interface for Windows: A timely Standard", *StandardView*, vol. 4, No.. 2, pp. 100–103 (Jun. 1999).

Business Wire: "Wabi 2.2 Delivers Pentium–Class Performance for Microsoft Windows Applications on Solaris; Wabi 2.2 and WabiServer 1.0 Now available in International Language". *Business Wire*, p. 5280068, Gale Group (May 1996).

Sun Microsystems Inc., "Wabi User's Guide," *SunSoft, Sun Microsystems, Inc. Business* (Nov. 1995).

O'Malley, et al., "USC: A Universal Stub Compiler", *Computer Communication Review*, vol. 24, pp. 295–306 (Oct. 1994).

Wei, Yi–Hsiu, et al., "The Design of a Stub Generator for Heterogeneous RPC Systems", *Journal of Parallel and Distributed Computing*, vol. 11, pp. 188–197 (1991).

* cited by examiner

PROGRAM-INTERFACE CONVERTER FOR MULTIPLE-PLATFORM COMPUTER SYSTEMS

This application is a Continuation of U.S. application Ser. No. 09/461,860 filed Dec. 15, 1999, now U.S. Pat. No. 6,233,731, which is a Continuation of U.S. application Ser. No. 08/912,454 filed Aug. 18, 1997, now issued as U.S. Pat. No. 6,026,238.

FIELD OF THE INVENTION

The present invention relates to electronic data processing, and more specifically concerns a software tool for generating a set of translation-code modules for translating application-program interfaces (APIs) from one platform to another, for use with an emulator which allows application programs written for one platform to be executed on a different platform.

BACKGROUND OF THE INVENTION

Present-day application programs almost never interface directly to the hardware of the computer system in which they execute. Instead, application program interfaces (APIs) call code modules which control the hardware, or which call programmed interfaces at yet lower levels. Most API code modules reside in an operating system (OS), although others may exist in a basic input/output system (BIOS), or in other places. Code modules for API functions typically reside in freestanding dynamic link library (DLL) files each containing routines for carrying out dozens or even hundreds of API functions.

Executing an application program written for one computer processor, operating system, or other platform on another platform requires a program, variously known as an emulator, simulator, interpreter, or translator, to convert instructions, data formats, application-program interfaces (APIs), and other characteristics of the application from those of its original platform to those of the native platform in which the emulator runs. Sometimes the original platform has been replaced, but the old application must still be run on the new platform. Sometimes programs are written to an abstract platform, so that the same application can be executed on numerous different platforms merely by writing an emulator for each native platform that is to host the abstract platform.

An emulator subsystem generally has two major components. The emulator itself converts the original processor instructions from the application into instructions or groups of instructions appropriate to the processor of the new platform, and executes them. An API translation layer "thunks" API calls from the original platform being emulated into calls to APIs written for the native platform; that is, it intercepts API calls made by an application written for the emulated platform, converts their arguments from the calling convention of the original platform to that of the native platform, then calls an appropriate native-platform module for executing the API function. A translation module or "API thunk" is a piece of program code in the translation layer which executes between a particular original API and the operating system running on the native platform.

Conventional practice involves hand-writing thunk code for each new and modified API. However, an API set may change daily during the development of an operating system. Also, the number of APIs can be very large. The Microsoft® Windows® NT®-operating system, for example, contains more than 3,500 APIs in 42 different DLL modules. Therefore, manual production of individual API translation code becomes increasingly impractical. Increasingly shorter product cycles compounds this problem.

Some interface modules or thunks have been generated from hand-written descriptors for each separate API. However these must be maintained separately from the APIs themselves, and thus involve costly additional effort. They also suffer from synchronization problems: if one or more modules inadvertently escape an update between one development iteration and the next, their down-level code may mistranslate an API, or may crash the system. Such problems can be difficult to find, thus forcing the entire development effort to wait.

Alternatively, a software tool has been employed to create a set of skeleton API thunks as C-language source files which were then hand-modified. This approach is impractical, in that rerunning the tool destroys all the hand edits.

SUMMARY OF THE INVENTION

A utility program according to the present invention creates and automatically updates code modules for translating APIs written for one platform so that they will execute properly on a different platform. The utility, executed for every new development iteration of an operating system or other software environment, uses a set of templates for constructing source code for the translation modules, based upon the functions performed by the APIs. Special translation requirements are handled by exception templates containing personalized translation code. Another kind of template performs type conversions from the original APIs' parameters or arguments into those of the different platform.

Automatic code generation in this manner enables much faster development iterations by providing an automated method of synchronizing the translation modules with changes made to the new operating system or environment. The code generator ensures that all translation modules are at the current updated level, which prevents system crashes caused by incompatible modules. It also greatly reduces errors within individual code modules resulting from prior hand generation methods, and eliminates errors across modules caused from different people working independently on different modules.

Other features and advantages, as well as modifications and additions within the scope of the invention, will appear to those skilled in the art from the following description.

DETAILED DESCRIPTION

Figure 1:
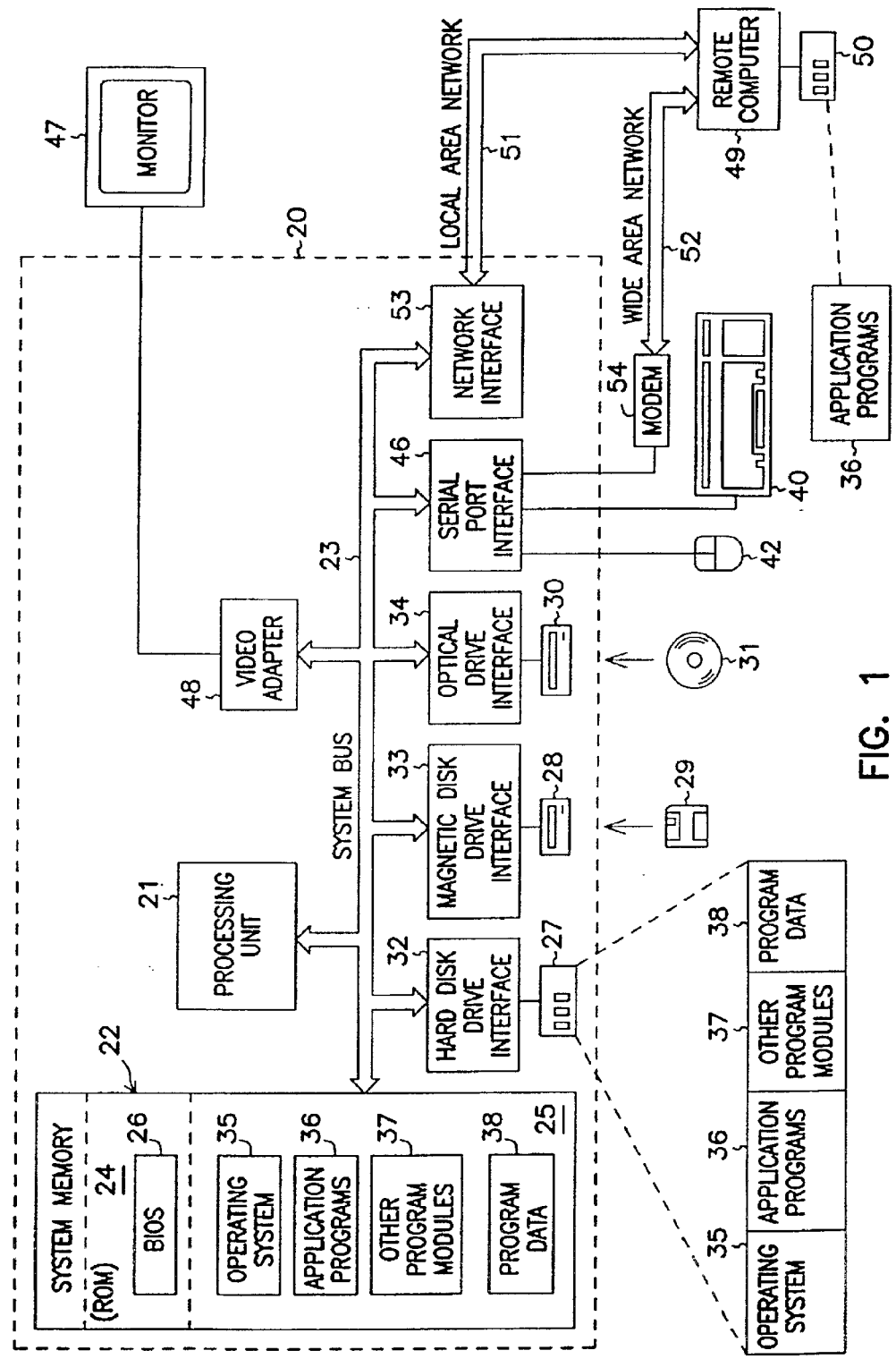
FIG. 1 is a block diagram of a computer system in which the invention may be practiced.

FIG. 1 provides a brief, general description of a suitable computing environment in which the invention may be implemented. Hardware and software environments will first be discussed, followed by a detailed description of the invention comprising a tool for creating and automatically updating code modules for translating APIs written for one platform so that they will execute properly on a different platform. The invention will hereinafter be described in the general context of computer-executable instructions such as program modules, executed by a personal computer (PC); however, other environments are possible. Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows an exemplary system for implementing the invention. It employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Figure 2:
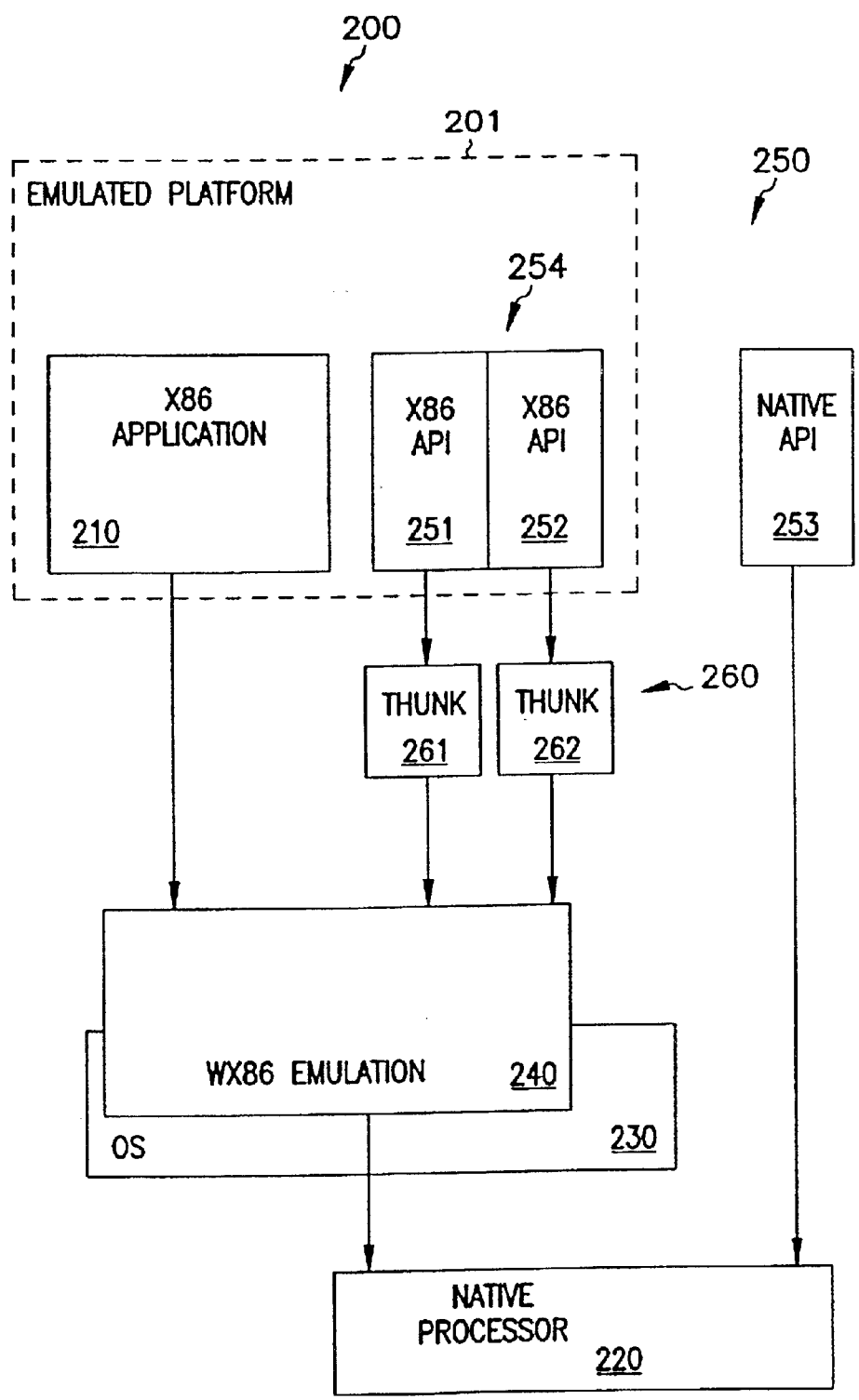
FIG. 2 is a high-level block diagram of a multiple-platform emulation environment in which the invention finds utility.

FIG. 2 shows a software environment 200 for running an application program 210 for one platform on a processor 220 representing a different platform. The elements enclosed in dashed line 201 are elements designed to be executed on a first platform such as a processor 21, FIG. 1, of the Intel AX86" familyXfor example an Intel 80386, 80486, or Pentium microprocessor. The other elements execute on a second platform, such as a Digital Equipment Corp. AAlpha" or an IBM APowerPC" microprocessor serving as processor 21. This description refers to the first and second platforms as the AX86" and Anative" platforms, respectively. For purposes of illustration, a native-platform version 230 of the -Microsoft® Windows® NT®- operating system serves as OS 35, FIG. 1.

Conventional emulator program 240 translates the instructions, data, and interfaces (APIs) of an X86-platform application program such as 36, FIGS. 1 and 2, from those of the X86 platforms to equivalent operations in the native platform. The APIs of an application program are actually calls to a set 250 of API modules 251–253, only a very few of which are shown in FIG. 2. API modules are commonly grouped into dynamic link libraries such as 254. As noted previously, OS 230 has thousands of APIs in more than forty DLLs; this set, collectively known as AWin32," is recompiled into a new Abuild" almost daily during a development effort. When application 210 calls an API written for the X86 platform, such as API 251, a conventional API translation layer 241 in emulator 240 retrieves the proper API module 251, and calls an associated translation-code module, or Athunk," 261 to convert any API arguments and data to the correct format for the native platform, and to perform functions which emulate those the API would have performed on the original X86 platform. The set of thunks 260 includes a separate module 261–262 for each X86 API 251–252. APIs such as 253 written for the native platform execute directly when called from OS 230, and do not require thunks.

Figure 3:
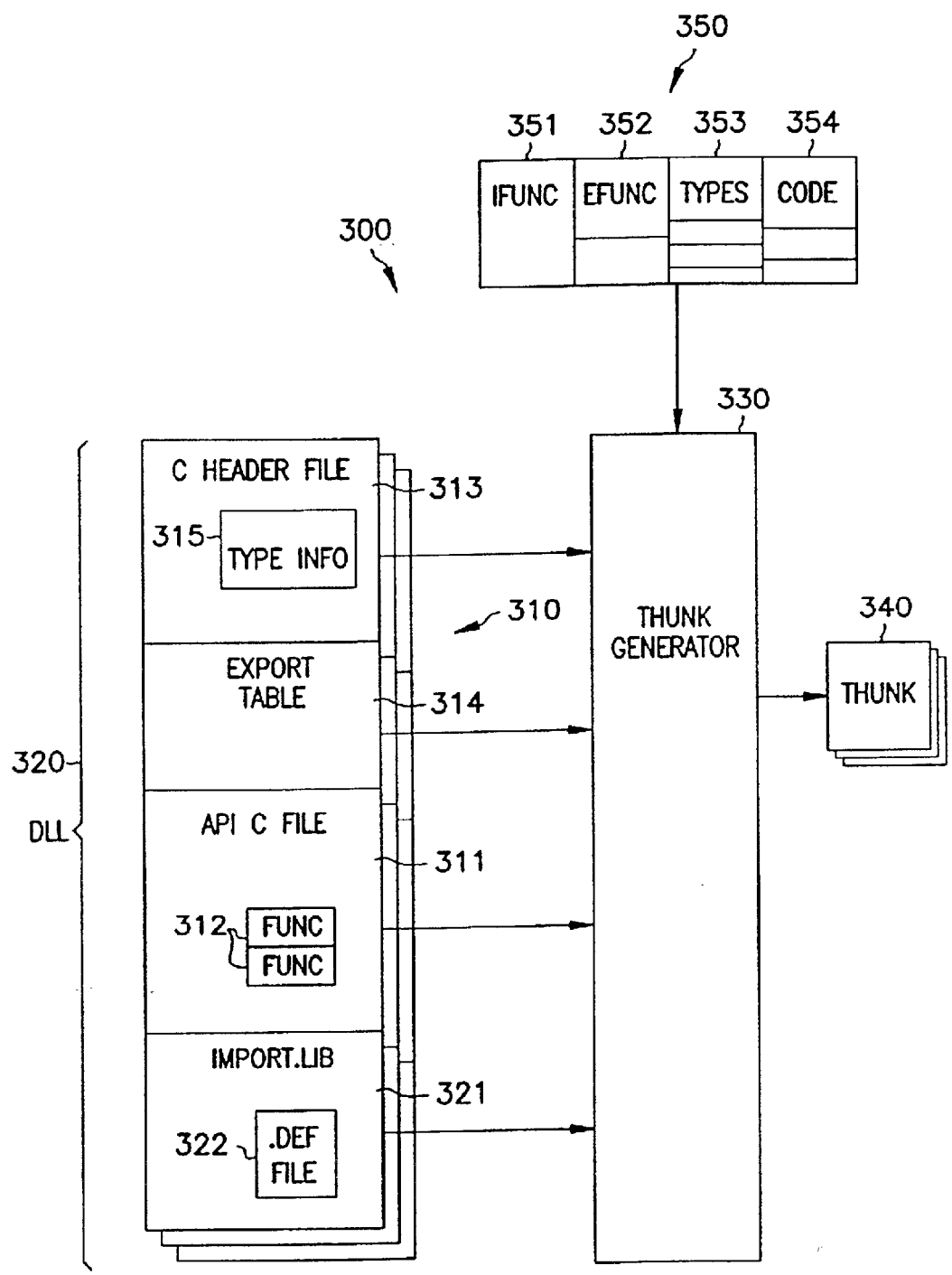
FIG. 3 is a high-level block diagram of a translator utility according to the invention, along with its inputs and outputs.

FIG. 3 is a high-level block diagram 300 showing a translator utility according to the invention, along with its inputs and outputs. Some of the elements shown in FIG. 2 have different labels in FIG. 3, to denote that the corresponding elements are in compiled object-code form in FIG. 2, but exist as source-code files in FIG. 3.

In its source-code form, each DLL 254, FIG. 2, is a collection 310 of files 311 each containing instructions in a language such as C for an API 250, FIG. 2. Each file represents one or more functions 312 to be performed by one of the APIs 251–252. (Some terminology: a dynamic link library is generated from three source files, viz a C source-code file, a C header file, and a .DEF file. The compiler converts these into two object files, a .DLL code file and an import .LIB file.)

A module-definition file (.DEF) file 322 specifies the list of functions which are to be exported from DLL 320 as APIs. The .DEF file compiled into an import library (.LIB) file 321. The .LIB file is significant because the API name exported from the DLL may differ from the function name in source file 311; for example, an entry FOO=BAR@4 in a .DEF file instructs the linker to export the function known internally as FOO from the DLL as BAR. Thunk generator 330 uses .LIB file 321 to associate an internal function name with an exported API name. C-language files have associated header (.H) files 313 that specify the external interface of their code file 311, such as data types and external variable names. In particular, header files include type information 315 for functions 312 in code files 311.

For example, a .H header file could contain a type definition such as:

```
Typedef struct tagFoo {
    int member1;
    int member2;
} *PFOO
``` and a function declaration:
    int AnApi (PFOO arg1, char*);
Generator 330 stores this information for all APIs. The entries for the above example might be:

```
TYPENAME  struct tagFoo
    MEMBER LIST
        MEMBER NAME      member1
        MEMBER TYPE      int
        MEMBER OFFSET    0
        MEMBER NAME      member2
        MEMBER TYPE      int
        MEMBER OFFSET    4
TYPENAME  PFOO
    INDIRECTION  1
    BASETYPE  struct tagFoo
APINAME    AnApi
    RETURN TYPE     int
    ARG NAME        arg1
    ARG TYPE        PFOO
    ARG NAME        <noname>
    ARG TYPE        char *
```

Finally, a conventional definitions (.DEF) file 322 may instruct a conventional linker (not shown) in OS 230 to export an internal API name from DLL 320 as a different name.

Translation generator 330 uses information from files 311, 313, and 321 to build C-language source-code files 340 which can be compiled into the translation-code modules 260 in FIG. 2. The invention provides a novel set of template files 350 for this purpose. Template (.TPL) files are descriptions of how to generate translation-code modules (Athunks≡). They comprise small amounts of hand-generated C code which implement generalized forms for iterating over API functions and their arguments, and for handling special cases which may arise in particular APIs. Each template has the following syntax:

```
[Type_of_Template]
TemplateName = Name_Of_Template
CGenBegin=
    <code to generate when this template is expanded>
CGenEnd=
```

There are four types of template 350.

The iterated-function (IFunc) template 351 iterates over API functions. Generator 330 expands one of these for each exported function in an API. The IFunc template 351 is the default expansion for APIs. The following example template will generate a skeleton thunk 340.

```
[IFunc]
TemplateName = HostFuncs
CGenBegin=
void
wh@ApiName (PULONG BaseArgs, ULONG RetVal)
{
    @ApiFnRet *pRetVal = (@ApiFnRet *) RetVal;
    @Types (Locals)
    @Types (Body)
    @IfApiRet (*pRetVal = ) @ApiName (@IfArgs (@ArgList (*((@ArgType *)
(@ArgAddr (BaseArgs))) @ArgMore(,))));
    @Types (Return)
}
CGenEnd=
```

Generator 330 expands each of the >@'-prefixed keywords in template 351 from the data collected from files 313 and 321 for a particular API 310 as follows:

| | |
|---|---|
| @ApiName | Internal name of the API |
| @ApiFnRet | Return type of the API |
| @Types(x) | Expands Type templates of the form > x, ≠ |
| @IfApiRet(x) | Expands > x, ≠ if the return type of the API is non-void |
| @IfArgs(x) | Expands > x, ≠ if the API has arguments |
| @ArgList(x) | Iterates over all arguments, expanding > x, ≠ for each argument |
| @ArgType | Type of argument |
| @ArgAddr(x) | Address of the argument, relative to > x, ≠ |
| @ArgMore(x) | Expands if there are more arguments after the current one |

For example, an API with prototype >HWND FindWindowA(LPSTR lpClass, LPSTR lpWindow)= expands to:

```
whFindWindowA (PULONG pBaseArgs, ULONG RetVal)
{
    HWND *pRetVal = (HWND *) RetVal;
    *pRetVal = FindWindowA( *(LPSTR *) (pBaseArgs + 0), * (LPSTR *)
(pBaseArgs + 1) );
}
```

An exception-function (EFunc) template 352 recognizes a particular API name, and overrides the default IFunc template 351 for that API. The following example template 352 produces fixed code for the particular API named >SetErrorMode'.

```
[EFunc]
TemplateName = SetErrorMode
CGenBegin=
void
wh@ApiName (PULONG BaseArgs, ULONG RetVal)
{
    @ApiFnRet *pRetVal = (@ApiFnRet *) RetVal;
    *pRetVal = SetErrorMode ((*(UINT *) pBaseArgs) *
SEM_NOALIGNMENTFAULTEXCEPT)
    *pRetVal & = -SEM_NOALIGNMENTFAULTEXCEPT;
}
CGenEnd=
```

EFunc templates provides a facility for custom-writing code for an API, while preserving robustness against API changes. Of course, the code for such an API can always be rewritten merely by rewriting its EFunc template.

A types (Types) template 353 creates a thunk 340 for each parameter, or argument, of each API file 311 which matches a specified type name. Types templates are powerful in that generator 330 applies them automatically to new APIs, providing correct thunking without manual intervention. Consider the following examples:

```
[Types]
TemplateName = Locals
TypeName = LPSTR
IndLevel = 0
CGenBegin=
```

-continued

```
    @ArgLocal = * ((@ArgType *) (pBaseArgs + ArgOff));
CGenEnd=
[Types]
TemplateName = Body
TypeName = Body
IndLevel = 0
CGenBegin=
    VALIDATE_LPSTR (@ArgNameLocal);
CGenEnd=
```

With these two templates, any API 311 which takes the C-language LPSTR data type automatically receives the special-purpose Types code in addition to the IFunc code for the default IFunc template. For example, the >FindWindowA' API described above now expands to:

```
{
    HWND *pRetVal = (HWND *) RetVal;
    LPSTR lpClass = *((LPSTR *) (pBaseArgs + 0);
    LPSTR lpWindow = *((LPSTR *) (pBaseArgs + 1);
    VALIDATE_LPSTR (lpClass);
    VALIDATE_LPSTR (lpWindow);
    *pRetVal = FindWindowA ( lpClass, lpWindow );
}
```

A code template 354 operates like a macro. It contains code which may be common to a number of other templates, and is referred to by name in those templates. For example, if the line

*pRetVal=SetErrorMode ((*(UINT*) pBaseArgs)* occurs many times in many different templates 351, 352, or 353, then that line could be placed in a code template such as one named, Aserrm.' The referring templates, such as the example above, then merely replace that line with the name of the macro, for example A[@serrm]≡. The conventional C macro facility then replaces the name with the code; C macros can, of course, be much more complex than this simple example.

Although the above templates are shown as written in the C language, they are language-independent. Templates 350 may generate code in C++, in assembler language, or in any other desired form.

Figure 4:
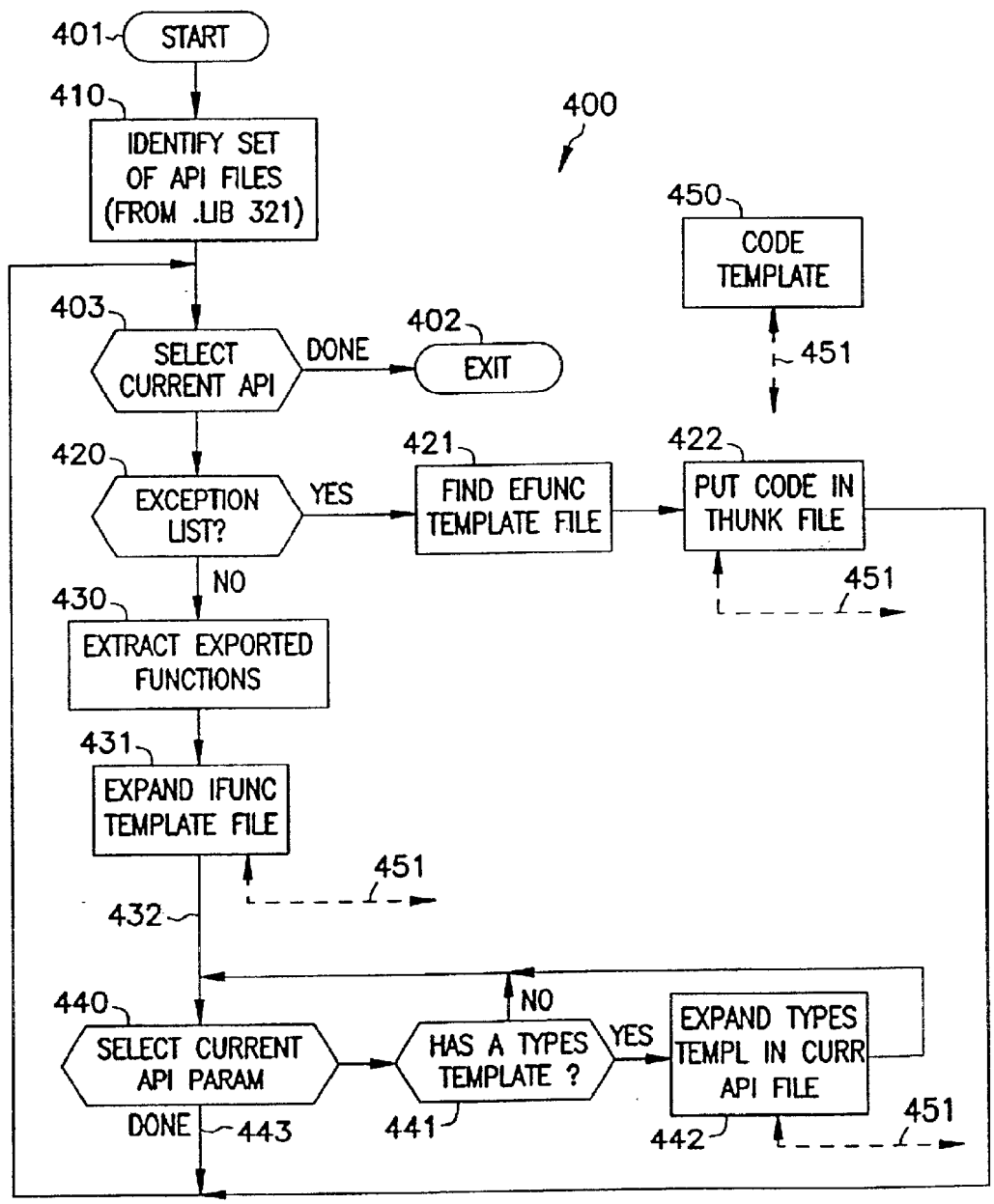
FIG. 4 is a flow diagram showing the operation of the translator of FIG. 3.

FIG. 4 describes the steps 400 carried out by translation-code generator 330, FIG. 3. The generator is run at 401 for every build of the operating system 230 or other entity whose APIs require regeneration. At its conclusion 402, the entire set of API translation-module source-code files 340 has been synchronized at the same level, and can be compiled in a conventional manner into the set of object-code modules 260, FIG. 2 which together form an API-translation portion (the Athunk layer≡) of emulator 240.

Block 410 scans all the DLLs 254 belonging to the OS 230 to identify the set of APIs (261, 262, . . . in FIG. 2) which require regeneration. The names of these APIs are in the export table 314 and in the import .LIB file 321 of each DLL, as previously described. (As a technical aside, the raw exports come from the import .LIB. However, many of them may be unnamed ordinals or renamed C functions. In order to obtain type information, generator 330 must reconstruct the name of the original function that implements each API. Thus, it must sometimes unmap the export name back to the function name.) Step 403 then sequentially selects a current API in the set for processing.

Step 420 may identify the current API as having an exception template 352, by a conventional table-lookup in a list of the exception-template names. If such a template exists, step 421 accesses the associated EFunc template, and step 422 places its source code into a thunk file 340 for that API.

If the current API is a normal API, step 430 reads export table 314 of its header file 313 to extract the names of all its exported functions. Step expands the IFunc template 351 for those functions, as described above. When step 431 has iterated through all the exported functions of the current API, exit 432 progresses to the next step.

Step 440 cycles through the parameters (arguments) of the current API, sequentially selecting one as a current parameter. If step 441 determines that a Types template 353 exists for this parameter type, then step 442 places the template" source code in the module 340, so that the API will process that argument type correctly. Most Types templates substitute a different value for a parameter. However, a Types template may perform other functions, such as validating the range of a parameter. Control passes to exit 443 when all Types templates have been processed.

Step 450 processes Code templates 354, FIG. 3. Whenever the name of a code template appears (as a macro name) in template-processing step 422, 432, or 442, dashed lines 451 call step 450 to expand a particular named code template and return the code to the calling template. Step 450 may actually occur later, when the thunk source-code files 340 are conventionally compiled into object-code modules 260.

It is to be understood that the above description is intended to be illustrative, and not restrictive. The invention may be used to provide for execution of interfaces from multiple prior platforms as opposed to just one. Further, template matching can be done in many different manners, such as by having a field in an interface which directly identifies a desired template. Many other embodiments will be apparent to those skilled in the art upon reviewing the above description. The scope of the invention should, therefore, be determined with reference to the appended claims, along with the full scope of equivalents to which such claims are entitled.

What is claimed is:

1. In a programmable digital computer, a method for generating a synchronized set of translation modules containing program code for executing on a native platform a corresponding set of interface modules written for an emulated platform, the method comprising:

identifying the set of interface modules written for the emulated platform and requiring translation for the second platform;

for all interface modules in the set, sequentially selecting a source-code file representing one of the set of interface modules as a current module;

extracting from the current-module data representing a group of functions exported by the current module;

matching the current-module data to a group of function templates, at least some of the templates containing generalized program code written for the native platform;

selecting at least one of the templates in response to the matching step; and for each template selected, converting the generalized program source code in the template into personalized program code constituting at least part of the translation module for the current module.

2. A method according to claim 1, further comprising:

determining that the current module matches one of a group of exception templates each containing program code; and generating at least part of the translation module for the current module from the program code of the one exception template.

3. A method according to claim 2, further comprising:

bypassing matching the current-module data against the function templates when the current module matches one of the group of exception templates.

4. A method according to claim 1 wherein the current module has at least one parameter having one of a group of types, further comprising matching the one parameter to one of a group of types templates; and generating at least some of the program code of the current translation module from the one types template.

5. A method according to claim 1, further comprising:

determining that one of the templates specifies the name of one of a group of a code templates; and incorporating source code from the specified code template in the one template whenever the one template provides code for a translation module.

6. A method according to claim 1 wherein the interface modules have an import table and reside in at least one link library, and wherein the identifying step comprises:

scanning the link library; and reading the names of the interface modules in the set from the import tables.

7. A method according to claim 1, further comprising:

iterating the matching, selecting and converting steps over each of the functions in the group of functions.

8. A computer-readable medium bearing representations of instructions and data for causing a computer to perform a method for generating a synchronized set of translation modules containing program code for executing a corresponding set of interface modules written for an emulated platform on a native platform, the method comprising:

identifying the set of interface modules written for the emulated platform and requiring translation for the second platform;

for all interface modules in the set, sequentially selecting a source-code file representing one of the set of interface modules as a current module;

extracting from the current module data representing a group of functions exported by the current module;

matching the current-module data to a group of function templates, at least some of the templates containing generalized program code written for the native platform;

selecting at least one of the templates in response to the matching step; and for each template selected, converting the generalized program source code in the template into personalized program code constituting at least part of the translation module for the current module.

* * * * *